Patented June 26, 1951

2,558,634

UNITED STATES PATENT OFFICE 2,558,634

PAPER IMPREGNATING OR SATURATING COMPOSITION

Jay J. Uber, Westfield, Mass., assignor to E. I. du Pont de Nemours & Company, Wilmington, Del., a corporation of Delaware No Drawing. Application February 9, 1949, Serial No. 75,505

5 Claims. (Cl. 117—155)

This invention relates to impregnating or saturating compositions for fibrous sheets and more particularly to such compositions comprising rubber (natural or synthetic) latex modified with lignin.

Papers and various fibrous sheets have been saturated with various types of compositions including rubber latex. One particular method called the "wet web" impregnation method is to impregnate the fibrous sheet during the time the sheet is being formed from the wet pulp and before it dries. Such a method is disclosed in U. S. Patent 1,966,458 issued to Izador J. Novak, July 17, 1934. Rubber latex impregnated papers made by such method or those made by the so-called cylinder method described in U. S. Patent 2,107,304, issued February 8, 1938, to Izador J. Novak are not entirely satisfactory since they have a tendency to delaminate as a result of insufficient binder content. It is either impractical or too costly to impregnate with enough rubber to prevent delamination. The papers impregnated or saturated with rubber latex (both synthetic and natural) are also lacking in abrasion resistance, water resistance, and stiffness for many uses such as midsoles for certain types of shoes, particularly work shoes and athletic shoes.

It is an object of this invention to provide a composition for impregnating or saturating fibrous webs which have improved properties with respect to waterproofness, ply adhesion, stiffness, hardness and abrasion resistance. A further object is the provision of a method for preparing an aqueous rubber (synthetic or natural) latex composition with lignin in colloidal suspension. A still further object is the provision of a lignin-rubber latex composition stabilized against gelation or coagulation of the rubber and/or lignin. A still further object of the invention is the provision of a laminated paper or fibrous web thoroughly saturated with a rubber-lignin mixture and in which the lignin is present in a water-insoluble form after the composition is dried. Other objects will become apparent as the description of the invention proceeds.

These and other important objects are accomplished according to the present invention by preparing a rubber latex composition containing lignin dispersed in colloidal form. The composition is prepared by dissolving the lignin in an alkaline aqueous solution of an alkali metal compound to form a water-soluble alkali metal salt of lignin, mixing the lignin solution with rubber latex in which the ratio of the lignin to rubber may vary between 1:9 and 1:1, and then adding to the latex-alkali lignin mixture an aqueous solution of an ammonium compound which forms free lignin dispersed in a colloidal state upon removal of ammonia.

Lignin has been used as rubber filler by incorporating the dry lignin powder in a rubber compound while it is being masticated on a two-roll rubber mill or other suitable mixing equipment. It has also been used as a filler and reinforcing agent for rubber by mixing an alkali solution of the lignin with rubber latex, co-precipitating the lignin and rubber with the aid of an acid, washing, drying, and finally milling the washed and dried crumb on conventional rubber mixing equipment. Heretofore, it has not been possible, however, to incorporate the lignin in an aqueous rubber latex by any of the known prior art methods in a form having a small enough particle size to penetrate the interstices of a paper web. Simple mixtures of rubber latex and alkaline aqueous solutions of lignin are of little or no value as saturants without the addition of an ammonium salt, since the alkali bound lignin migrates to the surface of the impregnated sheet during drying. Furthermore the lignin is still water-soluble and may be leached out.

By the term "rubber" as used throughout the specification and appended claims is meant natural rubber and synthetic rubber, such as, e. g. neoprene (polychloroprene), GRS and Buna S (copolymers of butadiene and styrene), Buna N, Hycar, and Perbunan (copolymers of butadiene and acrylonitrile).

The following table represents a range of formulations which are within the scope of this invention and are useful as paper or similar fibrous web saturants. All formulations throughout the specification are expressed on a parts or per cent by weight basis.

|  | A | B | C | D |
|---|---|---|---|---|
| 42% GRS Synthetic Rubber Latex | 2,540.0 [1](1,067.0) | 2,860.0 (1,200.0) | 3,046.0 (1,280.0) | 3,430.0 (1,440.0) |
| Lignin Solution: |  |  |  |  |
|   Lignin | 533.0 | 400.0 | 320.0 | 160.0 |
|   Sodium Hydroxide | 32.0 | 24.0 | 19.2 | 9.6 |
|   Water | 1,800.0 | 1,600.0 | 1,250.0 | 640.0 |
| Agerite White Dispersion: |  |  |  |  |
|   Agerite White [2] | 6.4 | 6.4 | 6.4 | 6.4 |
|   Wetting Agent (Sodium salt of polymerized alkylaryl sulfonic acid) | 0.6 | 0.6 | 0.6 | 0.6 |
|   Water | 9.0 | 9.0 | 9.0 | 9.0 |
| Sodium Salt of Pentachlorphenol | 4.0 | 4.0 | 4.0 | 4.0 |
| Ammonium Sulfate Solution: |  |  |  |  |
|   Ammonium Sulfate | 32.0 | 32.0 | 32.0 | 32.0 |
|   Concentrated Ammonium Hydroxide (29% $NH_3$) | 3.0 | 3.0 | 3.0 | 3.0 |
|   Water | 231.0 | 231.0 | 231.0 | 231.0 |
| Water | 3,096.0 | 3,075.0 | 3,344.8 | 3,740.4 |
| Total | 8,266.0 | 8,266.0 | 8,266.0 | 8,266.0 |
| Ratio of Lignin to Rubber | 1:2 | 1:3 | 1:4 | 1:9 |

[1] The numbers in parentheses above represent the solids in the latex.
[2] Agerite White is a trade name for symmetrical di-beta naphthyl-para-phenylenediamine which is referred to hereinafter as Agerite White for convenience.

The GRS synthetic rubber is made by emulsion copolymerization of butadiene and styrene.

The lignin solution is prepared separately by dissolving the lignin in the sodium hydroxide solution to form a water-soluble sodium salt of lignin. Heating will accelerate solution. If heated the solution is allowed to cool and is then slowly added to the latex while stirring to prevent local coagulation of the latex.

Agerite White dispersion which is prepared in a ball mill is added to the latex next with constant stirring, followed by the addition of the sodium salt of pentachlorophenol.

After all the ingredients except the ammonium sulfate solution and excess water have been added and thoroughly mixed, the composition is next diluted with the excess water after which the ammonium sulfate solution is added slowly while stirring rapidly to prevent local coagulation. If the ammonium sulfate solution is added before the composition is diluted with the excess water, the composition will thicken and form a gel. While the invention is not to be limited to any particular theory, it is believed the sodium salt of lignin reacts with the ammonium sulfate to form sodium sulfate, ammonia and colloidal lignin. While in solution the lignin acts as a stabilizer to prevent coagulation of the latex, but the stabilizing action is lost after reaction takes place during the drying process.

The above compositions did not coagulate after two weeks' storage at room temperature and were suitable for impregnating or saturating paper or fibrous webs. The apparatus and method disclosed in U. S. Patent 2,107,304 issued February 8, 1938, are suitable for this purpose.

In carrying out the invention about 1000 lbs. of cellulose fiber is first beaten in 19,000 lbs. of water to a slowness of 400 to 600 cc. as determined by a Canadian standard slowness tester, which usually requires 1 to 8 hours depending on the type and condition of the fiber selected. The beater stock is diluted to about 0.5% fiber content and about 99.5% water and is formed into a sheet or web on a Fourdrinier or cylinder machine as is well known in the art. Water is removed from the web by squeezing it between press rolls in the usual manner until it constitutes 50% to 70% of the wet web. At this stage the wet web is saturated with the latex-lignin composition described above, while supported on a wire mesh carrying screen by immersion in the latex-lignin saturating composition. The excess saturant is removed by passing the saturated web through squeeze rolls. The amount of saturant picked up by the wet web is controlled by the water content of the web entering the saturating bath, the concentration of solids in the bath and the amount of pressure applied by the squeeze rolls. The amount of saturant solids picked up by the web may vary between 5% and 50% based on the dry weight of the impregnated product.

The impregnated wet web may be dried as a single ply sheet or it may be wound on a make up roll where it is compressed and when the desired number of plies are obtained, the sheet is cut from the make up roll and removed as a single sheet of several plies which is then dried, tempered, and calendered to the desired thickness.

The dried and compressed sheets were satisfactory for use in making shoe parts such as counters, inner-soles and socklinings. The papers impregnated with the saturants referred to above had the following physical properties:

|  | A | B | C | D |
|---|---|---|---|---|
| Thickness, Inches | 0.036 | 0.037 | 0.035 | 0.035 |
| Weight/Sq. Yd., Lbs | 1.020 | 1.010 | 0.950 | 0.950 |
| Elemendorf Tear Strength: (In grams) (Machine Direction and Cross Machine Direction) | 624/832 | 688/944 | 688/912 | 656/864 |
| Taber Stiffness, g./cm. (Machine Direction and Cross Machine Direction) | 325/237 | 305/207 | 238/142 | 230/145 |

*Midsoling material for shoes*

The following is a description of a midsoling type material made with the compositions of this invention.

A beater furnish of the following composition was prepared:

| | Pounds |
|---|---|
| Colored cotton rags | 300.00 |
| Wood flour | 25.00 |
| Water-soluble dyestuffs | 2.75 |
| Unbleached kraft wood pulp | 500.00 |
| Water | 14,175.00 |

To obtain the correct fiber length and degree of hydration, the cotton rags are first beaten to a slowness of 400 cc. before the other fibers are added. After the wood flour, wood pulp and dyes are added, the furnish is beaten to a slowness of 275 cc. as determined by the Canadian standard slowness tester.

After the desired slowness is reached, the fiber slurry is diluted to a consistency of about 0.5% fiber and 99.5% water, and then it is transferred to a paper making machine. After the web has been formed on the paper making machine; and while it is still wet, it is immersed in a saturating bath of the following composition:

| | Pounds |
|---|---|
| Buna-S synthetic rubber latex (38% solids) | 142.00 |
| | (54.00—dry) |
| Lignin solution: | |
|   Lignin | 27.000 |
|   Sodium hydroxide | 1.700 |
|   Water | 104.430 |
|   Sodium salt of pentachlorphenol | 1.700 |
|   Pine oil | 0.170 |
| Agerite White dispersion: | |
|   Agerite White | 0.800 |
|   Organic dispersing agent | 0.320 |
|   Water | 1.168 |
| Ammonium sulfate solution: | |
|   Ammonium sulfate | 4.050 |
|   Concentrated aqueous ammonium hydroxide | 0.400 |
|   Water | 36.050 |
| Water | 130.500 |

The Buna-S is an interpolymer of butadiene and styrene and is a standard article of commerce.

After the wet web is saturated with the above composition, it is wound on the make-up roll until the desired thickness or number of plies are reached, and the superposed plies are then cut and removed from this roll in the form of a sheet equal in length to the circumference of the roll. This sheet is next dried, tempered, and finally calendered to the desired thickness.

The product described above was suitable for use as midsoling in the manufacture of shoes.

The following composition represents a slight modification in which potassium hydroxide is used in place of sodium hydroxide for dispersing the lignin:

| | Pounds |
|---|---|
| Buna-S latex (38% solids) | 1,972.0 |
| | (750.0—dry) |
| Lignin solution: | |
| Lignin | 375.0 |
| Potassium hydroxide | 37.5 |
| Sodium salt of pentachlorphenol | 18.0 |
| Pine oil | 4.5 |
| Water | 1,440.0 |
| Agerite White dispersion: | |
| Agerite White | 11.3 |
| Organic wetting agent | 0.5 |
| Water | 16.2 |
| Ammonium sulfate solution: | |
| Ammonium sulfate | 48.0 |
| Aqueous ammonium (29% NH₃) | 9.6 |
| Water | 370.0 |

The above composition was suitable for use in the manufacture of midsoles in shoe constructions. Before using as a saturant, however, it is diluted to a total solids concentration of from 5% to 25% depending on the properties required in the impregnated product.

The compositions below were employed to saturate a dry fibrous paper made from high alpha cellulose wood pulp. The table indicates the effect of ammonium sulfate on the internal bond of non-laminated fibrous sheets saturated with the compositions of this invention, in which the figures represent parts by weight.

| | 1 | 2 | 2.5 | 3 | 4 | 5 |
|---|---|---|---|---|---|---|
| Synthetic Rubber Latex (38% Solids) | 63.00 (24.00) | 63.00 (24.00) | 63.00 (24.00) | 63.00 (24.00) | 63.00 (24.00) | 63.00 (24.00) |
| Lignin Solution: | | | | | | |
| Lignin | 12.00 | 12.00 | 12.00 | 12.00 | 12.00 | 12.00 |
| Sodium Hydroxide | 0.80 | 0.80 | 0.80 | 0.80 | 0.80 | 0.80 |
| Water | 46.30 | 46.30 | 46.30 | 46.30 | 46.30 | 46.30 |
| Sodium Salt of Pentachlorophenol | 0.80 | 0.80 | 0.80 | 0.80 | 0.80 | 0.80 |
| Pine Oil | 0.10 | 0.10 | 0.10 | 0.10 | 0.10 | 0.10 |
| Ammonium Sulfate Solution: | | | | | | |
| Ammonium Sulfate | 0.30 | 0.60 | 0.90 | 1.80 | 2.40 | 3.00 |
| Aqueous Ammonium Hydroxide (29% NH₃) | 0.03 | 0.06 | 0.09 | 0.18 | 0.24 | 0.30 |
| Ply Adhesion—Scale Readings—Elemendorf Tear Tester | 27 | 34 | 72 | ¹70+ | ¹74+ | -------- |
| Penetration | Good | Good | Good | Good | Fair | (²) |
| Per Cent Saturant Absorbed Based on Weight of Paper Before Saturating | 33.6 | 34.3 | 33.5 | 34.7 | 35.0 | -------- |

¹ Feathered off.
² Comp. too viscous to penetrate wet web.
The number in parentheses in the above formula is the amount of solids in the latex.
The break in internal bond is shown by example No. 2.5 in the above table.

From the above data it will be observed that as the ammonium sulfate content increases, the ply adhesion increases. Compositions having 37.5% ammonium sulfate based on the caustic soda used to dissolve the lignin are not satisfactory for obtaining good ply adhesion, but those containing 80% to 360% ammonium sulfate based on the caustic soda are satisfactory. Compositions containing more than 360% of ammonium sulfate based on the caustic soda content tend to coagulate or gel the latex-lignin composition at the concentration indicated.

The ply adhesion test is carried out with the Elemendorf tear tester on a 1″ x 3″ strip of dried laminated paper, cut with the long dimension in the machine direction. The plies are separated manually at approximately the middle of the lamination at one end and pulled back a distance of 1½″. A strip of ½″ x 1½″ is cut from one side of the separated plies and a similar strip is cut from the opposite side of the other separated plies. The uncut strips from the separated plies are fastened in the jaws of the Elemendorf tear tester and the pendulum released. The reading represents the amount of pull required to continue the separations of the plies. Where the adhesion is greater than the strength of the fibers, the plies cannot be separated and will "feather off."

In the specific examples above, the ratio of lignin to rubber varies between 1:2 and 1:9. The preferred ratio is 1:2. However, for certain uses where hardness, stiffness and abrasion resistance is required ratios as high as 1:1 may be used.

The preferred ammonium compound to bring about the colloidal suspension of the lignin is ammonium sulfate. Other ammonium compounds may also be used for this purpose, such as, e. g. ammonium chloride, ammonium acetate, ammonium nitrate, etc. The amount of ammonium compound added to the compositions should preferably be sufficient to react with all the alkali bound to the lignin and allow the reaction to proceed to completion. This reaction is accelerated by heat and it usually takes place during the drying operations.

The compositions of this invention may be prepared with natural rubber latex, or any of the conventional synthetic rubber latices, such as, e. g. Hycar and Buna-N (copolymers of butadiene and styrene), Buna-S, and GRS (copolymers of butadiene and styrene), neoprene (polymerized chloroprene as well as mixtures thereof).

The impregnating or saturating compositions of this invention have the character of the rubber latex and contain approximately 20% solids. The preferred range of solids for the saturating compositions is 5% to 25% solids.

In the preferred embodiment sodium hydroxide is used as the alkali to dissolve the lignin, but as indicated in an alternate formula, potassium hydroxide may also be used.

The invention has been described with respect to paper impregnants or saturants, but it is to be understood that the rubber-lignin compositions prepared from the rubber latex are also useful as surface coatings for papers, fabrics and other fibrous sheets, such as felts. It is also possible to prepare unsupported films by casting the compositions on a temporary support and then evaporating the volatile portions after which the film is stripped from its temporary support.

Midsoles, innersoles, counters and other similar products made according to the present invention are highly resistant to the adverse effects of water. They also have about twice the Taber stiffness of conventional products and in addition exhibit exceptionally high ply adhesion and internal bond. In addition the impregnant is much less expensive than straight rubber latex.

The products of this invention can be and are used for things other than shoe parts. Examples are luggage bottoms, instrument cases, pistol holsters (toy), etc.

These advantages are primarily attributable to use of the colloidal lignin in the form in which it is released from its soluble sodium salt by reaction with an ammonium salt in combination with latex. An additional advantage accrues from the lignin salt's function as a stabilizer for the rubber when present in the proportions shown. Other uses for such a stabilized latex will be readily apparent.

It is apparent that many widely different embodiments of this invention may be made without departing from the spirit and scope thereof, and therefore, it is not intended to be limited except as indicated in the appended claims.

I claim:
1. The method of preparing impregnants for midsole stock and other similar products which comprises mixing from 1 to 9 parts of rubber in latex form with 1 part of a water-soluble sodium salt of lignin and precipitating therefrom free uncoagulated lignin by adding an ammonium salt to the mixture in amount between 80% and 360% based on the weight of the caustic soda used to dissolve the lignin.
2. The method of claim 1 in which the solids content of the impregnant is from 5% to 25%.
3. The method of preparing stock for shoe midsoles, counters and the like which comprises mixing from 1 to 9 parts of rubber in latex form with 1 part of a water-soluble sodium salt of lignin, precipitating free uncoagulated lignin from the mixture by adding an ammonium salt to the mixture in amount between 80% and 360% based on the weight of the caustic soda used to dissolve the lignin, impregnating a wet web of beaten cellulose fibers with the dispersion and thereafter heating the impregnated web until the lignin is precipitated as free colloidal lignin and ammonia is driven off.
4. A strong stiff paper impregnated with from 5% to 50% of its dry weight of a mixture of from 1 to 9 parts of rubber and 1 part of free uncoagulated colloidal lignin, said paper having been impregnated from a water dispersion containing the lignin in the form of a water-soluble sodium salt and a decomposable ammonia salt in an amount between 80% and 360% of its chemical equivalent of caustic soda used to dissolve the lignin.
5. The product of claim 4 in which the lignin is present in water-insoluble form.

JAY J. UBER.

REFERENCES CITED

The following references are of record in the file of this patent:

UNITED STATES PATENTS

| Number | Name | Date |
|---|---|---|
| 1,723,581 | Ruderman | Aug. 6, 1929 |
| 1,891,027 | Richter | Dec. 13, 1932 |
| 1,955,892 | Schur | Apr. 24, 1934 |
| 2,107,304 | Novack | Feb. 8, 1938 |
| 2,215,553 | Johnson | Sept. 24, 1940 |
| 2,309,089 | Bauer et al. | Jan. 26, 1943 |
| 2,325,302 | Britt | July 27, 1943 |
| 2,355,180 | Remy | Aug. 8, 1944 |
| 2,414,833 | Osborne | Jan. 28, 1947 |

FOREIGN PATENTS

| Number | Country | Date |
|---|---|---|
| 946,977 | France | June 20, 1949 |

OTHER REFERENCES

Manufacture of Pulp Paper, 2nd ed., vol. IV, sec. 3, pages 6 and 55, pub. by McGraw-Hill, New York (1927).

Collins: Paper Ind. & Paper World, June 1943, pages 263–269.

"Indulin," pub. by the West Virginia Pulp & Paper Co. (1946), 30 pages, booklet.